(12) United States Patent
Bahnasy et al.

(10) Patent No.: US 11,770,729 B2
(45) Date of Patent: *Sep. 26, 2023

(54) DISTRIBUTED SCHEDULING ALGORITHM FOR CPRI OVER ETHERNET

(71) Applicant: TELEFONAKTIEBOLAGET LM ERICSSON (PUBL), Stockholm (SE)

(72) Inventors: Mahmoud Mohamed Bahnasy, Lasalle (CA); Halima Elbiaze, Pierrefonds (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 114 days.

This patent is subject to a terminal disclaimer.

(21) Appl. No.: 17/527,427

(22) Filed: Nov. 16, 2021

(65) Prior Publication Data

US 2022/0078657 A1  Mar. 10, 2022

Related U.S. Application Data

(63) Continuation of application No. 16/496,124, filed as application No. PCT/IB2018/052597 on Apr. 13, 2018, now Pat. No. 11,178,563.

(60) Provisional application No. 62/485,168, filed on Apr. 13, 2017.

(51) Int. Cl.
| | |
|---|---|
| H04W 24/10 | (2009.01) |
| H04L 45/00 | (2022.01) |
| H04L 47/283 | (2022.01) |
| H04L 47/56 | (2022.01) |
| H04W 72/0446 | (2023.01) |
| H04W 88/08 | (2009.01) |
| H04W 92/12 | (2009.01) |
| H04L 12/46 | (2006.01) |
| H04W 56/00 | (2009.01) |

(52) U.S. Cl.
CPC ............. *H04W 24/10* (2013.01); *H04L 45/38* (2013.01); *H04L 47/283* (2013.01); *H04L 47/56* (2013.01); *H04W 72/0446* (2013.01); *H04W 88/085* (2013.01); *H04W 92/12* (2013.01); *H04L 12/4625* (2013.01); *H04W 56/0015* (2013.01)

(58) Field of Classification Search
None
See application file for complete search history.

(56) References Cited

U.S. PATENT DOCUMENTS

| | | |
|---|---|---|
| 2001/0004362 A1 | 6/2001 | Kamiya |
| 2018/0070373 A1 | 3/2018 | Muench |
| 2018/0192323 A1 | 7/2018 | Zhang |

FOREIGN PATENT DOCUMENTS

WO   2010024784 A1   3/2010

OTHER PUBLICATIONS

A. De La Oliva, An Overview of the CPRI Specification and Its Application to C-RAN-Based LTE Scenarios, Postprint version of IEEE Communications Magazine, 54 (2), 2016.

(Continued)

*Primary Examiner* — Faruk Hamza
*Assistant Examiner* — Cassandra L Decker

(57) ABSTRACT

Systems and methods are provided for scheduling the transmission of data in a datapath. A source node can send a registration request indicating its preferred sending time for data transmission. Intermediate nodes can determine if there are overlaps in timeslot reservations and adjust, and schedule, the requested preferred sending time accordingly.

21 Claims, 13 Drawing Sheets

(56) References Cited

OTHER PUBLICATIONS

A. Lometti et al., Backhauling Solutions for LTE Networks, ICTON 2014, Tu.A4.2, 2014 IEEE.
D. Chen et al, Qbv Optional for Fronthaul Over Ethernet, Nokia, Mar. 16, 2016.
D. Chitimalla et al., 5G Fronthaul-Latency and Jitter Studies of CPRI Over Ethernet, ,J. Opt. Commun. NETW/vol. 9, No. 2/Feb. 2017.
D. Chitimalla, TSN for Jitter Minimization in Reconfigurable Fronthaul, http://networks.cs.ucdavis.edu/presentation2016/Divya-04-22-2016.pdf, Apr. 22, 2016.
D. Lanzani et al., Fronthaul Evolution Toward 5G: Standards and Proof of Concepts, downloaded Dec. 22, 2017.
J. Farkas et al., Applicability of Qbu and Qbv to Fronthaul, Ericsson, Nov. 11, 2015.
M. Bahnasy et al., CPRI over Ethernet: Towards fronthaul/backhaul multiplexing, 2018 15th IEEE Annual Consumer Communications & Networking Conference (CCNC).
M. Bahnasy et al., Proactive Ethernet Congestion Control Based on Link utilization Estimation, 2016 International Conference on Computing, Networking and Communications (ICNC), Workshop on Computing, Networking and Communications (CNC), 2016 IEEE.
O. Kleineberg, 4 Important Things to Know about IEEE 802.1 & Time Sensitive Networking, AVB Time Sensitive Networking, automotive Ethernet, Industrial Ethernet, Industrial Internet of Things, IIoT, Industrial Networking, IEEE 802 PHY Hanover Fair, Hannover Messe, Apr. 27, 2016.
T. Wan et al., ZeroJitter an SDN based Scheduling for CPRI over Ethernet, IEEE 2016.
Tao Wan et al., A Performance Study of CPRI over Ethernet with IEEE 802.IQbu and 802.IQbv Enhancements, XP032872765, 2015 IEEE.

Algorithm 1: Timeslot registration algorithm

Input : reservation request $RES\_REQ$ & registration table $RTab$

Output: timeslot vector $TsVec$

1 foreach $RES\_REQ$ do
2     $T_{arr} \leftarrow read\_frame\_arrival\_time$ $TW \leftarrow$ time window size;
3     $L \leftarrow$ frame size;
4     $Ts \leftarrow read\ Ts$;
5     $T_{abs} \leftarrow Ts + T_{arr}$ ;
6     $t_L \leftarrow L/C$ $TsVec \leftarrow RTab.getRTab()$ if $(LCM(TW, TsVec.size)\ !=\ TsVec.size)$ then
7        $TsVec.size \leftarrow LCM(TW, TsVec.size)$ ;
8     if $(TsVec(T_{abs}:t_L)$ is $NOTIDLE)$ then
9        $Ts_{alloc} \leftarrow TsVec.nextAvailableTimeSlot(t_L) - T_{arr}$ $RES\_REQ.Ts = Ts_{alloc}$
10     for $i=0; i<RTab.size(); i++$ do
11        $RES\_REQ.add(RTab(i))$
12     end
13     $RTab.addTimeSlot(T_{abs}:t_L)$;
14     $T_{tr} \leftarrow current\_time$ for $j=0; j<RES\_REQ.size(); j++$ do
15        $Ts \leftarrow (Ts - (T_{arr} - T_{tr}))$
16     end
17     Forward $RES\_REQ$;
18 end

DISTRIBUTED SCHEDULING ALGORITHM FOR CPRI OVER ETHERNET

CROSS REFERENCE TO RELATED APPLICATIONS

This application is a continuation of U.S. application Ser. No. 16/496,124, which is a national stage application, filed under 35 U.S.C. § 371, of International Patent Application No. PCT/M2018/052597 filed on Apr. 13, 2018, which claims the benefit of U.S. Provisional Application No. 62/485,168 filed on Apr. 13, 2017, each of which is incorporated by reference herein in its entirety.

TECHNICAL FIELD

The present disclosure generally relates to wireless communications and wireless communication networks.

INTRODUCTION

The architecture for New Radio (NR) (also referred to as 5G or Next Generation) is being discussed in standardization bodies such as 3GPP. This study involves some of the following design principles: ultra-lean design in the new 5G radio access technology, self-contained transmissions, massive usage of beamforming, and decoupling between Idle and Connected connectivity.

NR is envisioned to be an ultra-lean system that implies the minimization of "always-on" transmissions, aiming for an energy efficient system that can account for future developments. For example, the NR looks to achieve: maximizing the amount of time and frequency resources that can be flexibly utilized or that can be left blank without causing backward compatibility issues in the future (blank resources can be used for future use); minimizing transmission of always-on signals; and confining signals and channels for physical layer functionalities (signals, channels, signaling) within a configurable/allocable time/frequency resource.

Ethernet has been proposed for the 5G fronthaul transport network between the baseband unit (BBU) pools and the remote radio heads (RRHs). The advantages of adopting an Ethernet transport include the low cost of equipment, the use of a shared infrastructure with statistical multiplexing, as well as the ease of operations, administration and maintenance (OAM). Additionally, for 5G to support key technologies such as massive multiple-input and multiple-output (MIMO) and Coordinated Multipoint (CoMP), the Common Public Radio Interface (CPRI) transport network should provide for high bitrates with very low latency and jitter.

The use of Ethernet as a primary networking protocol is widespread, such as in both data center networking and software defined networking (SDN). However, Ethernet was originally designed as a best-effort communication protocol and it does not support frame delivery guarantee.

SUMMARY

It is an object of the present disclosure to obviate or mitigate at least one disadvantage of the prior art.

In some aspects of the present disclosure, there are provided systems and methods for a distributed scheduling algorithm for Ethernet to support CPRI traffic.

In one aspect there is provided a method for scheduling data transmission performed by an intermediate node in a data path. The intermediate node can comprise circuitry including a processor and a memory, the memory containing instructions executable by the processor whereby the network node is operative to perform the various embodiments described herein. The method can include receiving, from a preceding node in the data path, a timeslot registration request message requesting a preferred sending time for scheduling at least one data transmission. It can be determined if a conflict exists between the requested preferred sending time and any previously scheduled timeslots. Responsive to determining there is a conflict between the requested preferred sending time and a first previously scheduled timeslot, a next available timeslot can be determined, to schedule the timeslot registration request, that satisfies the received timeslot registration request. The determined next available timeslot can be scheduled for the data transmission. An update message is transmitted, to the preceding node, indicating a modification to the requested preferred sending time; and a modified timeslot registration request message is forwarded, to a subsequent node in the data path, requesting the determined next available timeslot for scheduling the data transmission.

In another aspect there is provided a method for scheduling data transmission performed by an intermediate node in a data path. The intermediate node can comprise circuitry including a processor and a memory, the memory containing instructions executable by the processor whereby the network node is operative to perform the various embodiments described herein. The method can include receiving, from a preceding node in the data path, a timeslot registration request message requesting a preferred sending time for scheduling at least one data transmission. It can be determined if a conflict exists between the requested preferred sending time and any previously scheduled timeslots. Responsive to determining there is no conflict between the requested preferred sending time and the previously scheduled timeslots, the requested preferred sending time is scheduled as the timeslot for the data transmission. The timeslot registration request message can be forwarded to a subsequent node in the data path. The intermediate node can receive, from the subsequent node in the data path, an update message indicating a modification to the requested preferred sending time. The scheduled timeslot for the data transmission can be modified in accordance with the update message; and the update message can be forwarded to the preceding node.

In some embodiments, the timeslot registration request message can include at least one of a flow identifier, an indication of a recurring period of transmission, and a frame size.

In some embodiments, the scheduled timeslot can be added to a registration table. The registration table can be stored by the intermediate node. In some embodiments, the scheduled timeslot stored in the registration table can be modified in accordance with an update message.

In some embodiments, the requested preferred sending time can be translated to an absolute time. In some embodiments, the translation can be in accordance with at least one of a propagation delay between nodes, an arrival time of the request, and a processing time associated with the intermediate node. The determination of if a conflict exists is can be determined in accordance with comparing the translated preferred sending time to a registration table.

In some embodiments, determining if a conflict exists can be further in accordance with an indication of a recurring period of transmission.

In some embodiments, determining the next available timeslot can include time-shifting the requested preferred sending time. In some embodiments, the next available timeslot can be determined in accordance with the timeslot registration request message and/or parameters/requirements associated with the timeslot registration request message.

In some embodiments, the update message includes a time shift value indicating an amount to adjust the requested preferred sending time.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 7 illustrates an example timeslot reservation algorithm;

DETAILED DESCRIPTION

Figure 1:
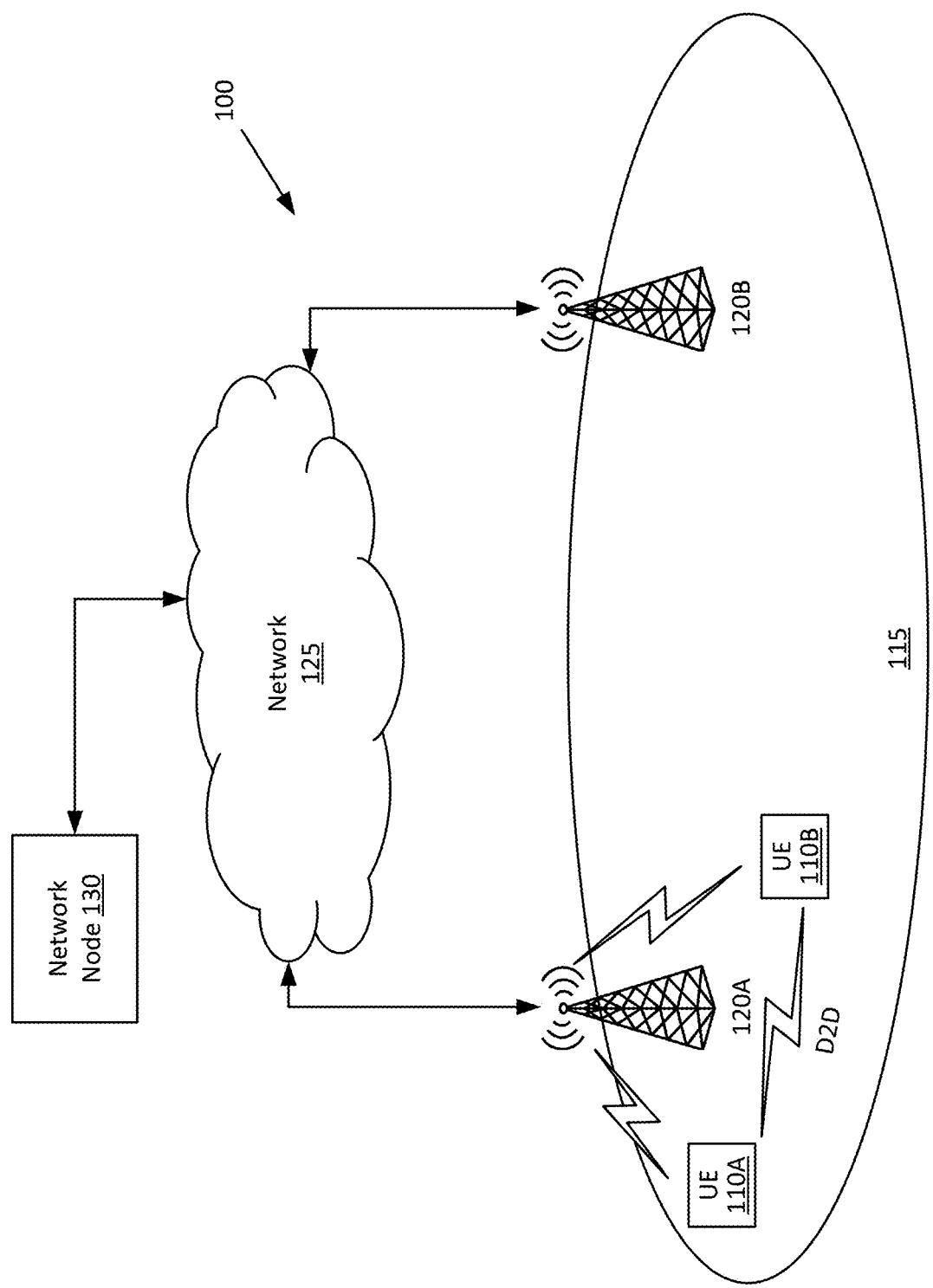
FIG. 1 illustrates an example wireless network.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB 1, etc.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, router, switch, forwarder, test equipment, etc. Example embodiments of a network node are described in more detail below with respect to FIGS. 10 and 12.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a UE or a network node.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different TPs of the same (shared) cell.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include: symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

FIG. 1 illustrates an example of a wireless network 100 that can be used for wireless communications. Wireless network 100 includes UEs 110A-110B and a plurality of network nodes, such as radio access nodes 120A-120B (e.g. eNBs, gNBs, etc.) connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes over an internode interface.

The exponential increase in wireless network users and the large bandwidth required by new mobile applications has led to increases in wireless network traffic. These demands require the envisioned 5G cellular system to provide very high data rates (e.g. up to 10 Gbps per user) and sub-milliseconds latency, particularly for time-critical applications. In order to achieve ultra-high user data rates, 5G networks may require a shorter radio transmission distance. In some embodiments, this can be achieved by distributing the remote radio head units (RRHs) into smaller cells.

One approach is to split the functionality of the radio access node 120 into radio equipment (e.g. the RRHs that are distributed in each cell and consist of antenna and basic radio functionality) and radio control equipment (e.g. the baseband unit (BBU) which processes baseband signals and can be located in a central office). Embodiments of this solution are referred to as a centralized radio access network and/or a cloud radio access network (C-RAN), as a single BBU can be shared by many RHHs. Based on traffic load, many lightweight RRHs can be deployed into smaller cells and connected to fewer BBUs in a centralized BBU pool. The emergence of virtualization and cloud computing with its cost efficiency, high performance, scalability, accessibility allows for virtualizing the BBU pool in the cloud.

Conventional base stations are often dimensioned for their busiest times, and users move between cells. Thus in a certain period of time when users move, for example, from office to residential areas, a huge amount of processing power is wasted in the regions where the users have left. By moving the digital processing units into a centralized location, many users and RRHs could share the network resources (in this case via a BBU pool). Consequently, it is possible to achieve statistical multiplexing gain, increase network efficiency and reduce cost.

Figure 2A:
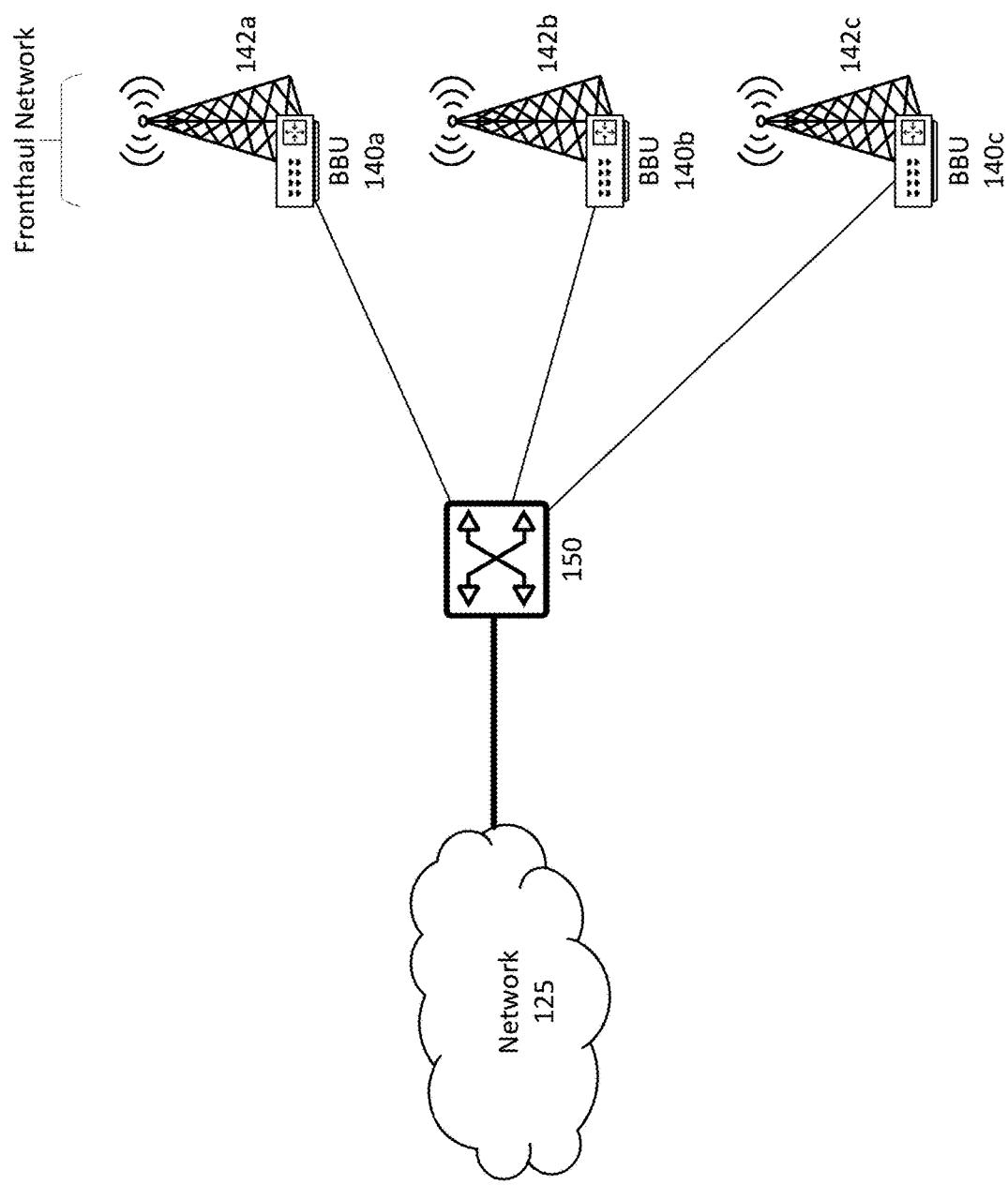
FIG. 2a illustrates an example conventional RAN deployment.

FIG. 2a illustrates an example conventional RAN deployment. It is noted that the RRH 142a-142c and BBU 140a-140c are located in the same building/location. CPRI can be used for data transfer between the antenna and the baseband processing (e.g. between RRH 140a and BBU 142a), while other transport mechanisms can be used between the BBUs 140a-140c and an intermediate node, such as switch 150, and the network 125.

Figure 2B:
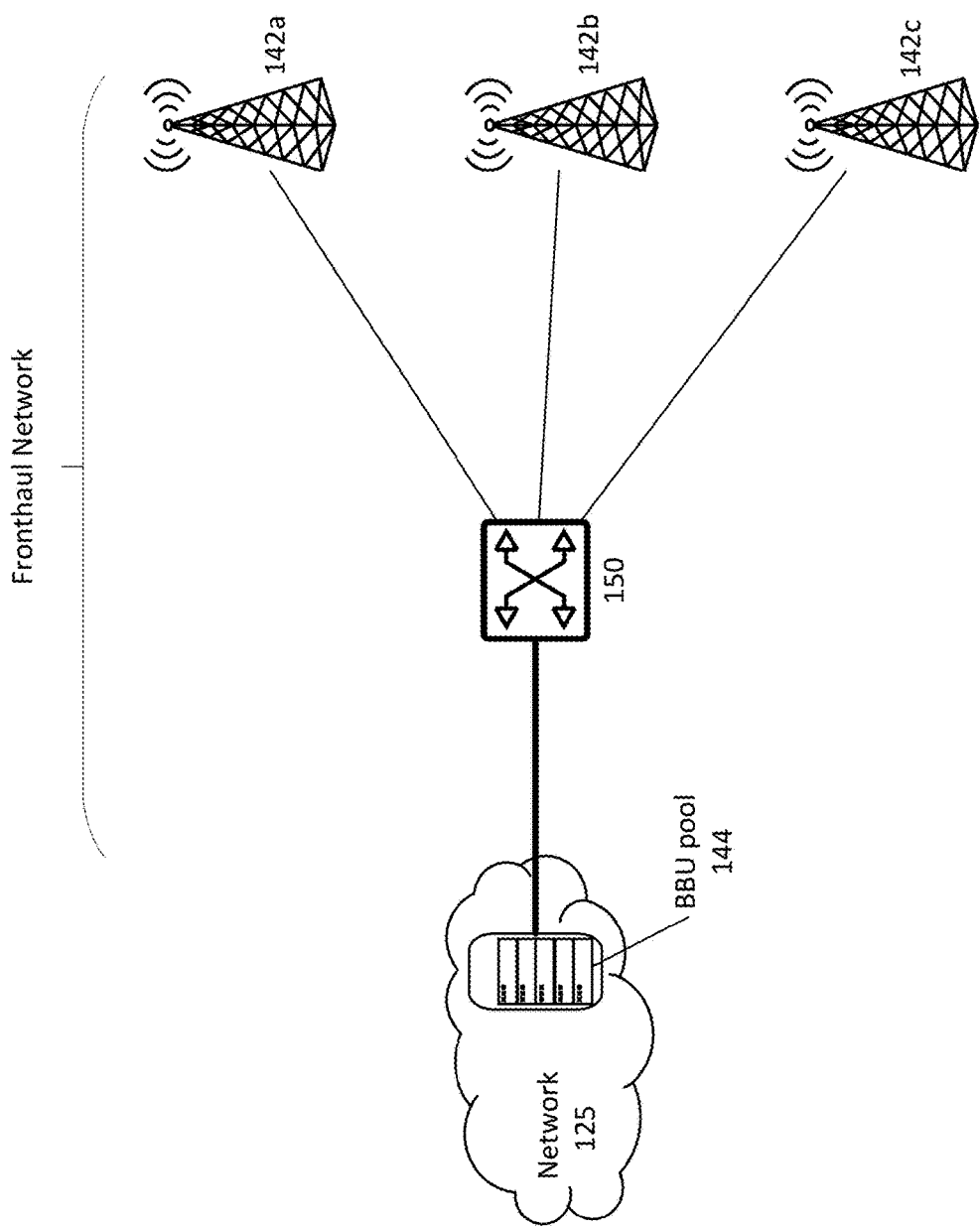
FIG. 2b illustrates an example C-RAN deployment.

FIG. 2b illustrates an example C-RAN deployment. A centralized BBU pool 144 is located in the core network 125. In this case, CPRI can be used for data transfer between the antenna and the baseband processing (e.g. from RRH 142a-142c to switch 150 to BBU pool 144). As such, the example switch 150 of FIG. 2b will support CPRI.

In conventional RAN deployments, such as FIG. 2a, digitized baseband complex in-phase and quadrature I/Q quantized radio samples are only transmitted between rooftop and basement (e.g. between antenna/RRH 142 and BBU 140). However, in a C-RAN deployment such as FIG. 2b, the separation between BBU 144 and RRH 142 introduces a different fronthaul network. In order to transfer I/Q radio samples over such a network, stringent characteristics should be provided, particularly, low jitter and latency, high bandwidth, low bit error rate BER, and accurately synchronized network.

CPRI and open base station architecture initiative (OB-SAI) have been discussed as the internal interface between RRHs and BBUs. CPRI is commonly used by RAN vendors and has become the de facto standard for fronthaul transport. CPRI was intended to support distance, between the RRH and the BBU using a bi-directional point-to-point topology. However, the CPRI specification allows different topology configurations (i.e. star, chain, tree, ring, and multi-hop options). The CPRI interface must satisfy fronthaul network requirements. For example, in some cases, base stations may be required to prepare an acknowledgment (ACK)/non-acknowledgment (NACK) within 3 ms, including BBU and RRH processing and propagation delay, which leaves 100 µs for the fronthaul one-way delay. In addition, CPRI has a one-step jitter requirement of several nanoseconds. The fronthaul network further requires high bandwidth. For example, a 2×2 multiple-input and multiple-output MIMO RHH can require 9.83 Gbps and it increases to 162.2 Gbps for an 8×8 MIMO. CPRI may also require strict synchronization between BBU and RRH.

In some embodiments, CPRI traffic can be encapsulated over Ethernet. Ethernet can provide for standard methods of network management and performance monitoring. Furthermore, shared Ethernet can serve the same number of users with less equipment. Therefore, standardization activities held by the IEEE P1904.3 Radio over Ethernet (RoE) aim to exploit the Ethernet developments and specify a scalable and streamlined packet based radio interface solution. In addition, the time-sensitive network TSN task group, in IEEE802.1, is studying a set of standards aiming to provide synchronized, low latency, and high bandwidth services over Ethernet networks.

Some embodiments provide for using Ethernet technology as a fronthaul network protocol while employing a distributed scheduling mechanism. The proposed protocol can be implemented inside Ethernet switches to define a periodic timeslot for transmitting CPRI flows. Because a CPRI flow is constant bitrate (CBR) with fixed sampling time, it can be transmitted with identical inter-frame gaps. Consequently, reserving a periodic timeslot can deliver CPRI frames without queuing delay nor jitter.

In IEEE 802.1Qbu frame preemption, when a time-critical frame (TCF) is received while serving non-time-critical frame (NTCF), the switch stops processing the NTCF and begins processing the TCF. Once the switch finishes processing the TCF, it resumes processing the NTCF. This process could be repeated several times for the same NTCF. Therefore, TCFs experience smaller delay and delay variation.

IEEE 802.1Qbv is a time aware traffic shaper that can open or close the gate for a traffic class. High priority traffic can be transmitted as soon as its gate opens, which can reduce jitter.

IEEE 802.1Qcc Stream Reservation Protocol (SRP) is proposed as a new protocol to be implemented on top of the existing Multiple Registration Protocol (MRP) 802.1Qak. The MRP protocol allows streams to register their attributes (e.g. bitrate, maximum delay, etc.) across the network.

Another requirement for wireless networks is clock synchronization. This stringent synchronization accuracy provides for radio channels of neighboring cells that do not overlap in the used spectrum. Poor frequency synchronization in cellular network base stations can lead to call drop, slow handover between cells and channel interference. Therefore, all radio equipment should be accurately synchronized.

One of the potential solutions that could be used to address the synchronization issue is IEEE 1588 Precision Time Protocol (PTP). PTP is developed as part of the G.8275.1 standard to provide synchronization at Layer 2 and higher for different network technologies. Also, ITU-T has defined Synchronous Ethernet (Sync-E) in the G.8261 standard. Sync-E requires all network nodes to participate in clock synchronization. Other research such as Network Time Protocol (NTP), that provides synchronization over Layer 3 with IP routed technologies, can be exploited for fronthaul networks. It can be expected that a fronthaul network will use one of the aforementioned clock synchronization protocols.

Another challenge that faces CPRI over Ethernet is the delay and its variations that face every packet based on the queue occupancy. To address this issue, a distributed timeslot scheduling algorithm for CPRI over Ethernet (DTSCoE) will be discussed herein. DTSCoE can be used to attempt to reserve network resources (e.g. a timeslot) for a particular flow. In DTSCoE, each CPRI source node ("talker") can propagate its intention of sending information to a CPRI destination node ("listener"). Due to the constant bitrate nature of the CPRI flow, it can be transmitted with fixed inter-packet gap. Thus, a CPRI source can convey its sending intention by defining a preferable start time Ts within a periodic time frame, referred to as the time window TW, and the maximum frame size L. Therefore, the intermediate nodes can reserve a timeslot that starts at the requested time and is repeated after a fixed TW period. In addition, DTSCoE does not define a fixed time-slot reservation. Instead, it defines a maximum frame size. This can allow a node to serve non-time critical frames once the CPRI frame is sent, which can reduce link idle times and increase link utilization.

Figure 3:
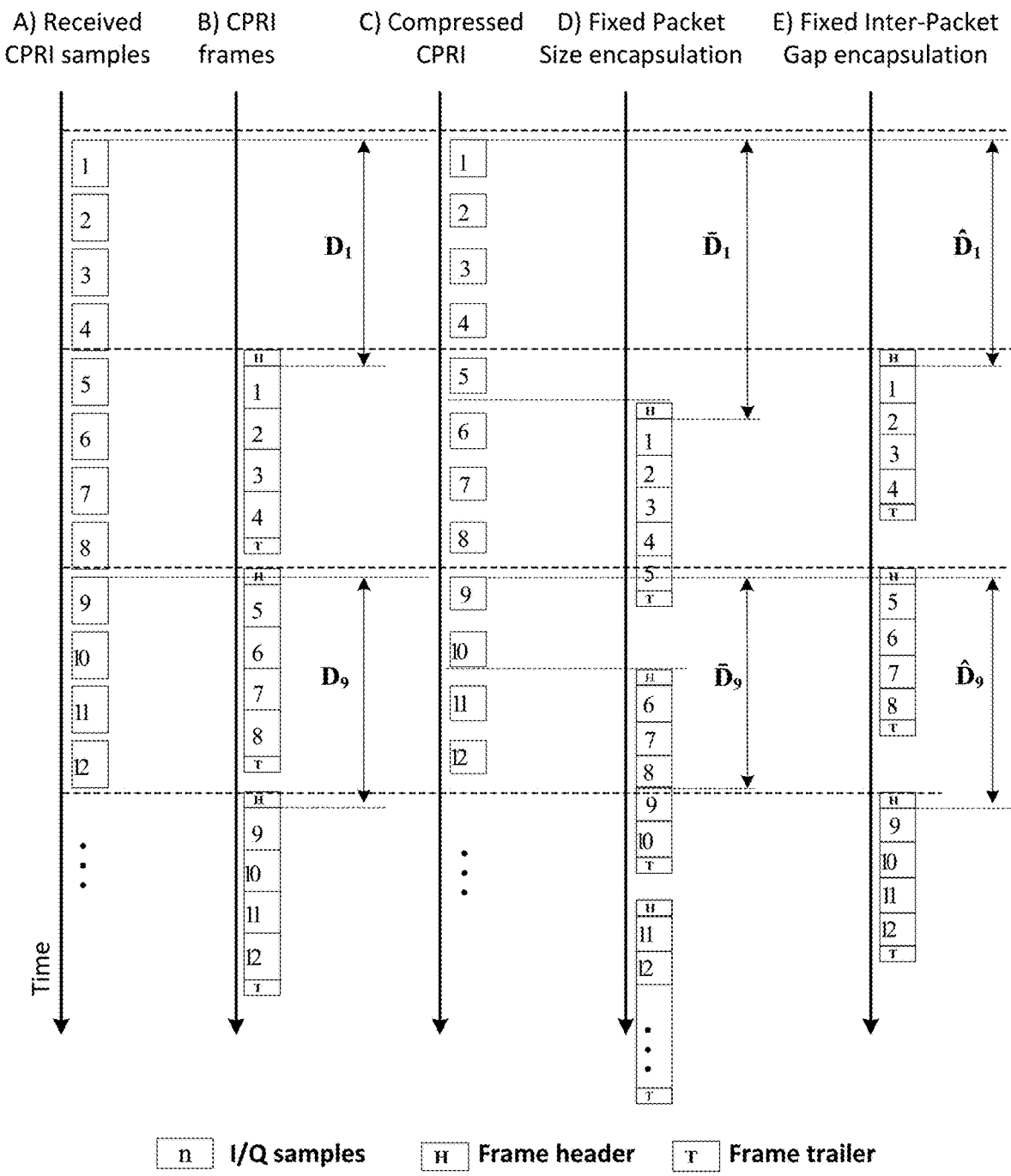
FIG. 3 illustrates an example CPRI framing process.

FIG. 3 illustrates an example CPRI encapsulation/framing process. In this example, it is assumed that a RRH receives I/Q samples from an antenna and processes the data. Timeline A) shows the uncompressed received CPRI samples. Timeline B) shows the conventional CPRI framing process, where four I/Q samples are placed in a CPRI frame. Timeline C) shows the compressed I/Q samples.

Once the CPRI traffic is compressed, it can be encapsulated and transmitted according to one of the two following options: D) fixed packet size (e.g. fit as many samples into one frame); or E) fixed inter-packet gap (e.g. a constant number of samples in each frame). The first option can reduce link overhead caused by frame headers/trailers. However, it can increase the queuing delay because the sender needs to wait until there is enough data to fill an entire frame. This can introduce variable delays (jitter) as shown in Timeline D ($\overline{D}_1 \gg \overline{D}_9$). On the other hand, the fixed inter-packet gap option experiences high frame overhead but it provides smoother traffic with almost steady delays (no jitter) as shown in Timeline E ($\hat{D}_1 \approx \hat{D}_9$). Network providers may prefer the second approach because it makes CPRI traffic convenient with time synchronization requirement. The second approach allows a switch to reserve the time-slot by defining a periodic and fixed inter-packet gap and its maximum occupancy.

In some embodiments, the switch can forward/transmit a CPRI flow at its reserved timeslot by either (i) not serving non-time critical frames (NTCFs) that might overlap with the CPRI time-slot, or (ii) serving NTCFs normally and starting a frame preemption process before CPRI time-slot due time. The second approach has the potential to reduce link idle time while waiting for CPRI frames by partially serving NTCFs. In addition, DTSCoE can define the timeslot by a maximum frame size, which allows the switch to (i) allocate timeslot period $t_L$, based on its link capacity C as follows $t_L = L/C$, and (ii) reuse the link once the CPRI frame is served.

In order to avoid long negotiation between network nodes, if the requested timeslot is occupied, in some embodiments, each CPRI flow requests a reservation not defined by its start time, but defined by its periodic occurrence in addition to its maximum frame size. With this mitigation, network nodes can reserve any available timeslot within the requested TW. This relaxed constraint can reduce the reservation phase to one step rather than renegotiating a new timeslot in case of reservation failure. This proposal exploits the fact that in CPRI flows the encapsulation process can be shifted within the time window TW.

Figure 4A:
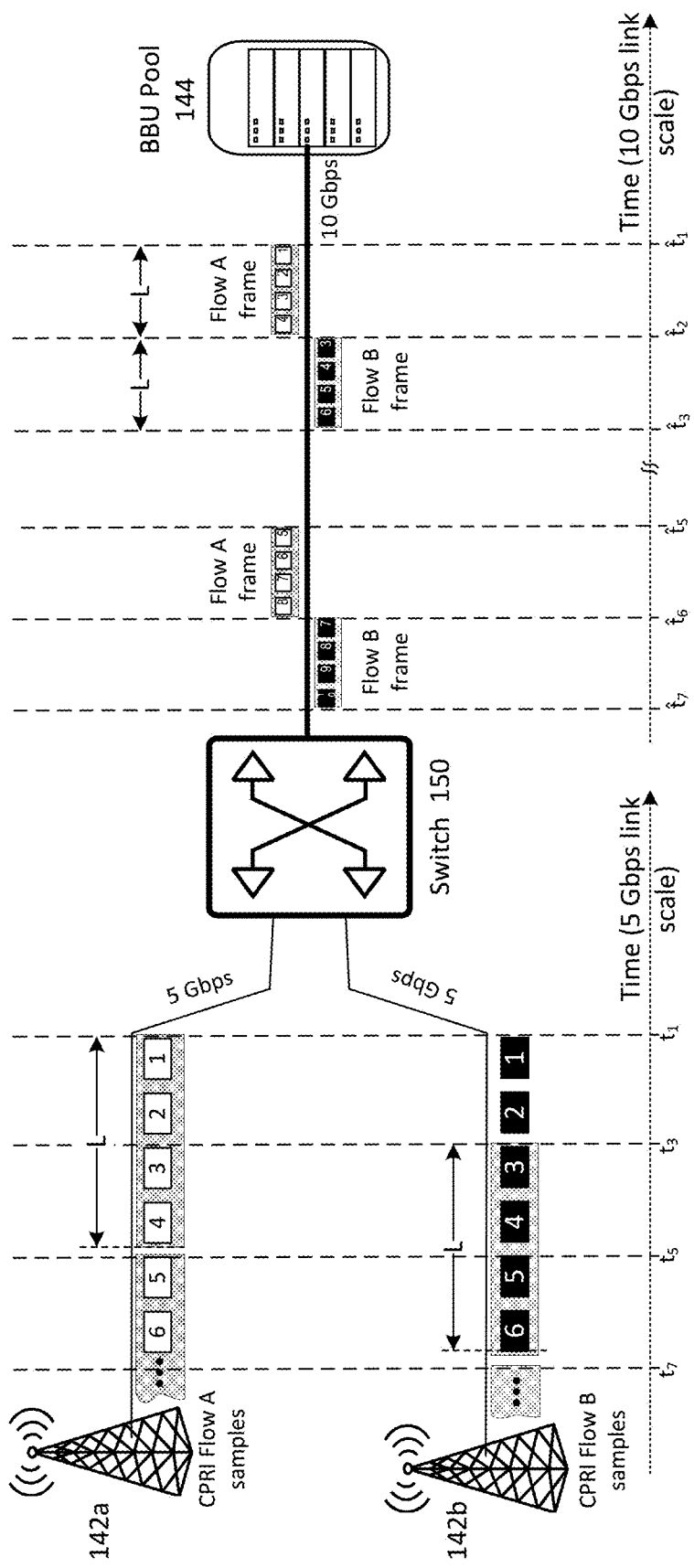
FIG. 4a illustrates a first example of encapsulation shifting.

FIG. 4a illustrates a first example of encapsulation shifting, where there are two flows trying to send at the same time with rate of R=5 Gbps. In this scenario, the switch needs ($L/10^{10}$=L×$10^{-10}$ sec) to serve one frame, where L is the frame size. Thus by shifting the Flow B encapsulation process by L×$10^{-1}$ sec, which equals two samples time $t_s$=¼×L/5×$10^9$=2L×$10^{-10}$ sec, the switch is given enough time to finish serving the Flow A frame and then serve the Flow B frame. Thus, both Flows A and B are served sequentially with almost zero queuing delay at the cost of dropping two samples at the start of the system.

Figure 4B:
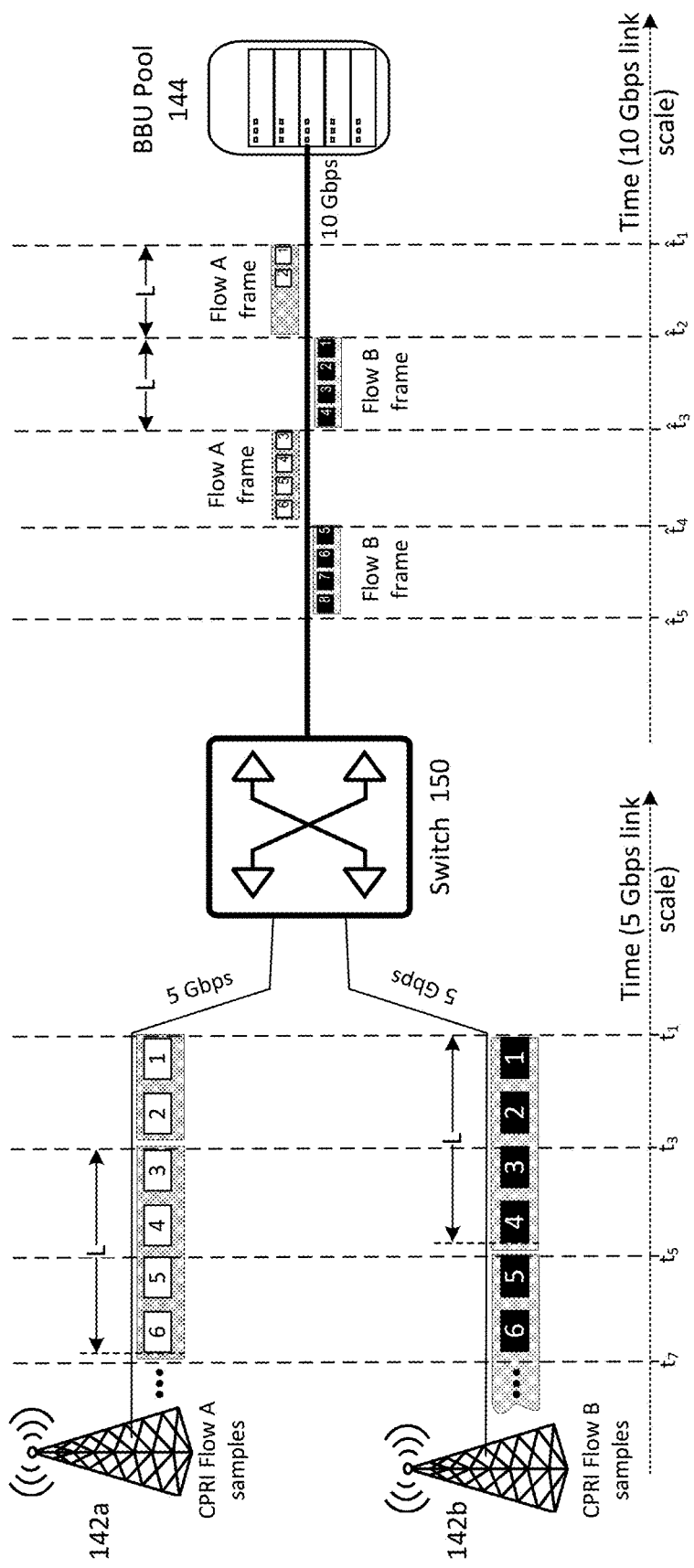
FIG. 4b illustrates a second example of encapsulation shifting.

FIG. 4b illustrates a second example of encapsulation shifting. Again, Flow A and Flow B try to send at the same time with rate of R=5 Gbps. In this scenario, each flow frame of size L has 4 samples of size Ls which produces a sample time equal to $t_s$=(Ls/R=¼×L/5×$10^9$=5L nanoseconds). The switch needs a frame transmission time of $t_p$=(L/10×$10^9$=10 L nanoseconds=$2t_s$) to transmit two samples. Thus, by shifting the Flow A encapsulation process by the frame transmission time $t_p$ which, in this scenario, equals two sample times ($2t_s$), the switch will have enough time to finish transmitting Flow A frame and then transmit Flow B frame. As shown in FIG. 4b, Flow A can send a smaller frame that contains only two samples in order to align its encapsulation timing with Flow B, and then, the encapsulation can proceed normally (e.g. with 4 samples per frame). Thus, both Flows A and B frames are transmitted sequentially with almost zero queuing delay at the cost of transmitting only one frame (e.g. the first frame of one of the flows) with fewer samples at the beginning of the process.

In some embodiments of DTSCoE, the reservation process is initialized by the source node (e.g. the RRH). Each source node propagates a registration request that includes its stream attributes (which can include the following parameters: flow ID, TW size, preferred sending time Ts, and maximum frame size L) toward the listener/receiver (e.g. the BBU). The declaration-to-registration reaction occurs in a single direction from the declaring participant to its adjacent node. This process is repeated until it reaches the listener. It will be appreciated that, although some embodiments are described with the RRH as the sending node and the BBU as the receiving node, they are also applicable in the opposite direction (e.g. BBU is the sender, RRH is the receiver).

Each network node in the data path can register its information in a locally stored table, which will be referred to as the registration table RTab. This table can be used to define another table, referred to as the timeslot table TsTab with a size equal to the least common multiple (LCM) of all declared TWs. Each entry in the RTab table must be represented by at least one entry in the TsTab table based on the LCM value. If a requested timeslot (defined by Ts, L, and TW) is not available, the network node can allocate a new/modified timeslot by searching for an available timeslot of width equal to $t_L$, =L/C and starts at time $Ts_i$ that is determined by (1):

$$Ts_i = i \times TW + Ts \qquad \text{(Equation 1)}$$

Where i={0, 1, ..., TsTab.size/TW}. The node can then update the registration request with the new preferred Ts and send back an update acknowledge indicating the change (or time shift) that was applied on the requested sending time (e.g. $Ts_{Shift}=Ts_{alloc}-Ts$). Additionally, each node can add its currently occupied timeslots to the forwarded request. By adding the occupied timeslots to the registration request, each node can avoid allocating any timeslot that is already allocated in other nodes, along the data path, while searching for a new preferred timeslot. This can facilitate the reservation process and enable it to happen in one step. Once the registration request reaches the listener node, it can reply with one of the following attributes (i) ready, (ii) ready failed (e.g. at least one listener is unable to reserve resources), (iii) asking failed (e.g. there are no listeners that succeeded in reserving resources), (iv) update, or (v) ignore. Finally, the RRH(s) can start sending their CPRI flows within the reserved timeslot by using the final Ts.

Figure 5:
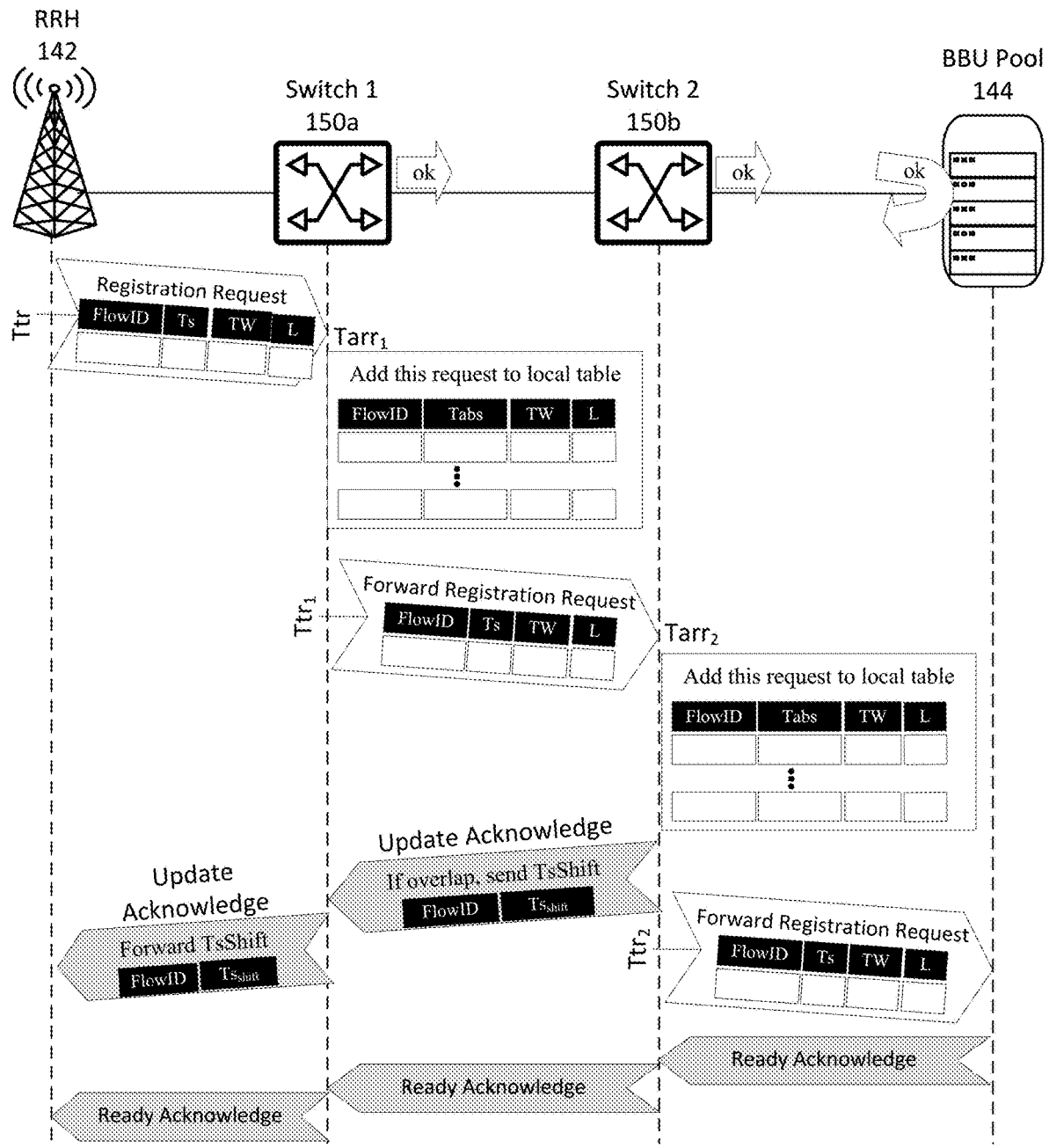
FIG. 5 illustrates an example declaration-to-registration process.

FIG. 5 illustrates an example declaration-to-registration process. The example signaling path includes RRH 142, intermediate nodes Switch 1 150a and Switch 2 150b, and BBU Pool 144. The RRH 142 sends a registration request with maximum frame size L and TW=L/R, where R is the CPRI traffic rate. When Switch 1 150a receives this registration request, it maps the received Ts to an absolute value using Equation 2:

$$Tabs = Tarr(\bmod TW) + Ts \qquad \text{(Equation 2)}$$

Then, it searches for any overlap in its local TsTab table. In this example, it will be assumed that Switch 1 150a does not find any overlaps, and it forwards the registration request after mapping Ts to the transmission time $Ttr_1$ using Equation 3:

$$Ts_{out} = Ts - Ttr(\bmod TW) \qquad \text{(Equation 3)}$$

For this example, when the registration request reaches Switch 2 150b, it finds an overlap. As such, Switch 2 150b modifies the requested/preferred sending time Ts (without solicitation thanks to the aforementioned relaxed constraint). Then, it forwards the registration request to the BBU 144 and it sends an update acknowledge backwards to inform the preceding network node(s) (e.g. to Switch 1 150a) of the modification to be applied to Ts. The update acknowledge includes the preferred sending time shift value $Ts_{Shift}$ because the Ts value has no meaning in the backward direction. At the BBU 144, a ready acknowledge can be created and sent back to the source. This distributed process spreads the timeslot reservation information along the data path without any centralized coordination which avoids scalability issue that may face centralized solutions.

However, in alternative embodiments, a centralized unit can be used to perform timeslot reservation, such as a software defined networking (SDN) controller. SDN has the potential to facilitate the reservation process and propagate the command(s) to all participant nodes in one step. New messages or extensions for the SDN network can be defined for timeslot reservation and frame preemption tasks.

Background traffic may experience queuing delay due to CPRI traffic timeslot reservation. As such, a flow control mechanism can be used to control transmission.

It is noted that some embodiments of DTSCoE may require strict clock synchronization among network nodes in order to perform timeslot reservation. This synchronization can be provided for fronthaul networks as discussed herein. However, other allocation algorithms can be considered that do not require clock synchronization.

Figure 6:
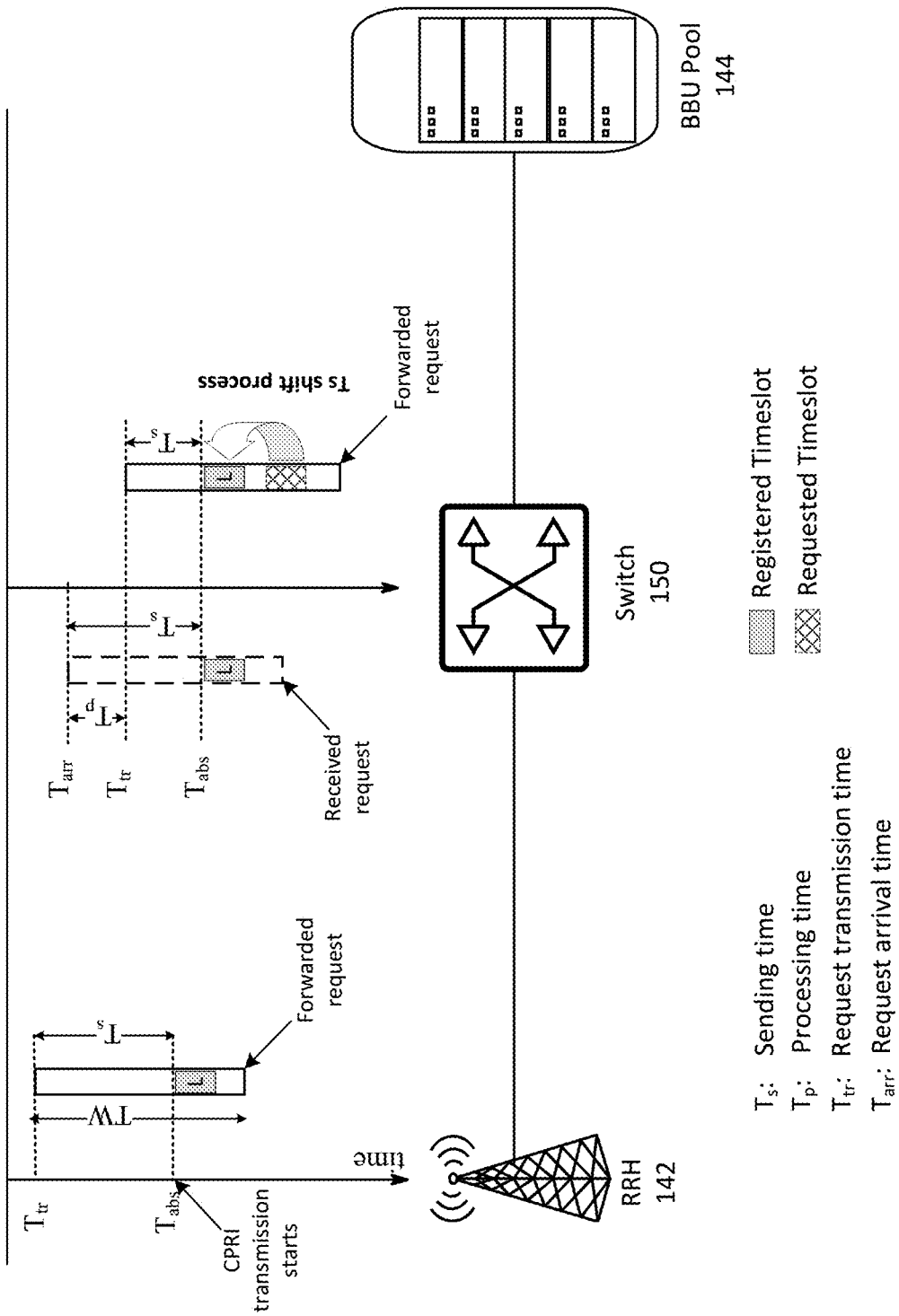
FIG. 6 illustrates an example declaration-to-registration process using time window shift.

FIG. 6 illustrates an example declaration-to-registration process using time window shift. FIG. 6 illustrates an example of how each network node can update the preferred sending time Ts in order to remap it to the request transmission time Ttr. The example signaling path includes RRH 142, intermediate node Switch 150 and BBU Pool 144. The registration request arrival time Tarr at each node can be used as a reference time for its request; i.e. TW starts at $T_0$ which is mapped to the arrival time Tarr. For example, Tarr is the arrival time of the registration request at Switch 150. Thus, the preferred sending time Ts is not an absolute time, rather, it is the period between the SRP request send time, which is mapped to $T_0$, and the CPRI traffic first frame. Taking into consideration that CPRI traffic will not experience the queuing or processing delay that the reservation request experienced, therefore, each node can shift the registration Ts forward by the processing time (Tp=Tarr–Ttr), where Tarr is the arrival time and Ttr is the transmission/sending time of the request. This shifting process forces the absolute preferred sending time Tabs to be identical in both the received request (shown as a dotted rectangle in FIG. 6) and the forwarded request (shown as a solid rectangle in FIG. 6).

Performing the same process at each network node forces the requested timeslot to be delayed only by the propagation/transmission delay between nodes which will be identical for both CPRI frames and registration requests. Accordingly, shifting the reservation inside TW by the processing time $T_p$ can resolve synchronization issues while considering implicitly the propagation/transmission delay. In some embodiments, padding can be added to a registration request to match the length of a CPRI frame such that the transmission time will be identical. As shown in FIG. 6, by using this process, the shifted timeslot within TW at Switch 150 matches the received timeslots after shifting the original TW by the propagation delay.

FIG. 7 illustrates an example timeslot reservation algorithm 200. For each new request, parameter initialization occurs in lines 1-7. Then, TsVec is initialized in line 8. The LCM is calculated and used to update TsVec in lines 9 and 10. In lines 11-13, network node verifies if the requested timeslot is available, otherwise it allocates a new one. In lines 14-16, the registration request is updated with the occupied timeslots in the requested path. In line 17, the requested timeslot is registered in RTab. Finally, in lines 18-22, the Ts shifting process takes place, and the request is forwarded to the subsequent node.

In addition to the clock synchronization problem that was resolved using the Ts shift process, clock drifting could cause, in the long term, timeslot overlap. To overcome this issue, each CPRI node can repeat the reservation process after a predefined time T Further, a guard band can be used (similar to IEEE 802.1Qbv) before the timeslot start time and equal in size the largest possible time drift per T.

Another issue that may hinder the registration process is when time window sizes of different flows are mismatched. To resolve this issue, LCM can be used to find the TsTab table size that satisfies all requested TWs. Yet, with the repetition of timeslots within the TsTab table, overlap could occur. In this case, the switch can redefine a new inter-packet gap time that prevents overlap within the time window. Therefore, a CPRI source could redefine its frame size to the new inter-packet gap according to Equation 4 to keep the same flow rate:

$$L_{new} = TW_{new} \times L/TW \quad \text{(Equation 4)}$$

Because DTSCoE is a distributed mechanism, it is possible that an update acknowledge will overlap with a recently registered request. In this case, a fail acknowledge should be sent to the source, and the source can send a new registration request.

DTSCoE is discussed herein as a timeslot scheduling mechanism for Ethernet networks. Source nodes can declare their intention of transmitting data by sending a registration request that can include preferred sending time Ts, a time window TW and a maximum frame length L information. Solutions to prevent the overlap due to the repetition of timeslot reservation within the TsTab table can be further considered.

Those skilled in the art will appreciate, that in an example network with multiple source nodes scheduling data transmission(s), additional consideration may be required. In some embodiments, a source node or a switch node can hold, or delay, transmitting a new registration request until any current (e.g. "in progress") request(s) are scheduled and an acknowledgement has been received. This can be defined with a flag in the reservation table. By delaying the registration process until all pending requests are completed (either positively or negatively acknowledged), uncoordinated behavior can be resolved. This mechanism can be implemented at the source node and/or at a switch depending on the specific implementation.

Figure 8:
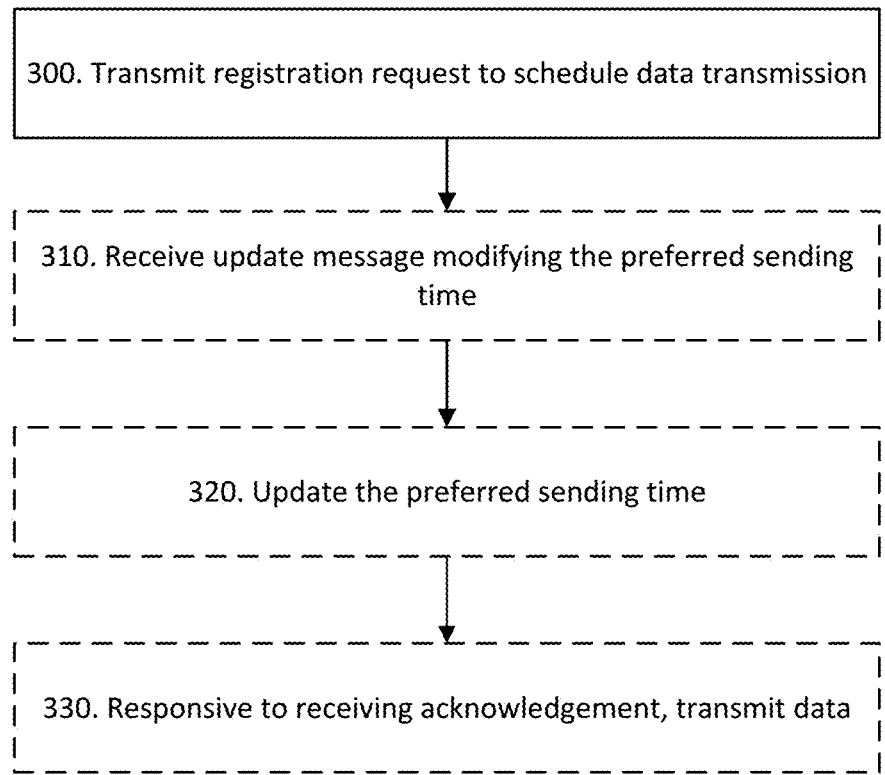
FIG. 8 is a flow chart illustrating a method which can be performed in a source network node.

FIG. 8 is a flow chart illustrating a method which can be performed in a source network node, such as an RRH or a BBU as have been described herein, in a data path. The method can include:

Step 300: Transmitting a registration request to schedule at least one data transmission. The registration request can be a timeslot reservation message. The registration request can include at least one of a flow identifier, an indication of a requested/preferred sending time, an indication of a recurring period of transmission, and/or a frame size. In some embodiments, the preferred sending time can indicate a relative preferred sending time, relative to the actual transmission time of the request. The registration request can be transmitted to a subsequent node in a data path. In some embodiments, the subsequent node can be an intermediate node such as a switch. The data transmission can comprise CPRI traffic over Ethernet.

Step 310 (optional): Receiving an update message indicating a modification to the preferred time sending time. The update message can include a time shift value, indicating an amount to adjust the preferred sending time relative to the originally requested preferred sending time. The update message can be received from the subsequent node in the data path.

Step 320 (optional): Responsive to receiving an update message, modifying the preferred sending time in accordance with the update message. Because this is a distributed process, the source node does not need to re-send the updated registration request. Each node in the data path can update its locally stored preferred sending time accordingly.

Step 430 (optional): Responsive to receiving an acknowledge that the registration request has been scheduled, transmitting data.

It will be appreciated that one or more of the above steps can be performed simultaneously and/or in a different order. Also, steps illustrated in dashed lines are optional and can be omitted in some embodiments.

Figure 9:
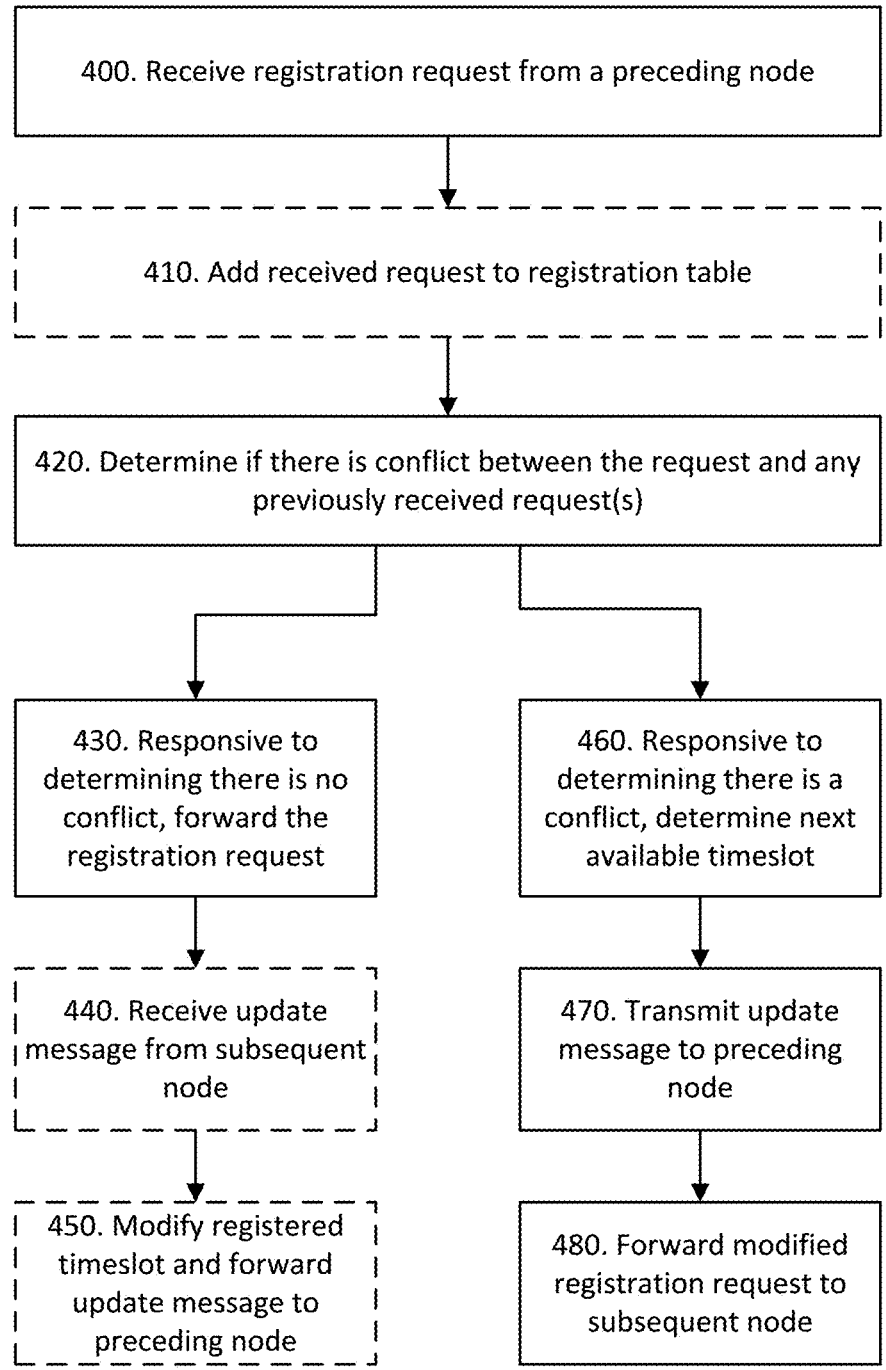
FIG. 9 is a flow chart illustrating a method which can be performed in an intermediate network node.

FIG. 9 is a flow chart illustrating a method which can be performed in an intermediate network node, such as a switch as has been described herein, in a data path. The method can include:

Step 400: Receiving a registration request to schedule at least one data transmission. The registration request can be a timeslot reservation message. The registration request can include at least one of a flow identifier, an indication of a preferred sending time, an indication of a recurring period of transmission, and/or a frame size. The registration request can be received from a preceding node in a data path. In some embodiments, the registration request can be received from a source node, such as a RRH. In other embodiments, the registration request can be received from a second intermediate node, such as a second switch. The data transmission can comprise CPRI traffic over Ethernet.

Step 410 (optional): Adding the received registration request to a registration table. The intermediate node can include a locally stored registration table for compiling timeslot reservations and associated information. The table can include ongoing and upcoming timeslot reservations for the intermediate node. In some embodiments, this can further include mapping or translating the indication of a preferred sending time to an absolute time. The translation can be performed in accordance with the propagation delay between nodes, the arrival time of the request, and/or the processing time associated with the switch, etc.

Step 420: Determining if there is a conflict, or overlap, between the requested preferred sending time and any previously requested timeslot. Previously requested timeslots can be stored in the registration table at the intermediate node.

Step 430: Responsive to determining there is no conflict, scheduling/registering/storing the requested preferred sending time as the scheduled timeslot for the CPRI over Ethernet data transmission, and forwarding the registration request. In some embodiments, the preferred sending time can be modified in the forwarded registration request. The preferred sending time can be modified in accordance with the available timeslots at the switch. The registration request can be forwarded to a subsequent node in the data path. In some embodiments, the subsequent node can be a subsequent intermediate node. In other embodiments, the subsequent node can be a destination node, such as a BBU.

Step 440 (optional): In some embodiments, after forwarding the registration request, an update message can be received. The update message can be received from the subsequent node in the data path. The update message can indicate a modification to the requested preferred sending time (e.g. the timeslot registered in step 430).

Step 450 (optional): Responsive to receiving the update message, the intermediate node can modify the scheduled/registered timeslot for the CPRI over Ethernet data transmission in accordance with the update message. The update message can be forwarded to the preceding node.

Step 460: Responsive to determining there is a conflict between the requested preferred sending time and a previously requested timeslot, the intermediate node determines the next available timeslot to schedule the request that satisfies the received registration request. The requested preferred sending time can be time-shifted to a next available timeslot that is determined in accordance with satisfying the parameters/requirements associated with the registration request.

The determined next available timeslot can then be scheduled/registered/stored for the CPRI over Ethernet data transmission. The registration table entry can be updated with the modified timeslot information.

Step 470: Transmitting an update message to the preceding node in the data path indicating the modification to the preferred sending time. The update message can include a time shift value, indicating an amount to adjust the preferred sending time relative to the originally requested preferred sending time.

Step 480: Forwarding the modified registration request, including the modified preferred sending time. The modified registration request can be forwarded to a subsequent node in the data path. In some embodiments, the subsequent node can be a subsequent intermediate node. In other embodiments, the subsequent node can be a destination node, such as a BBU.

It will be appreciated that one or more of the above steps can be performed simultaneously and/or in a different order. Also, steps illustrated in dashed lines are optional and can be omitted in some embodiments.

Figure 10:
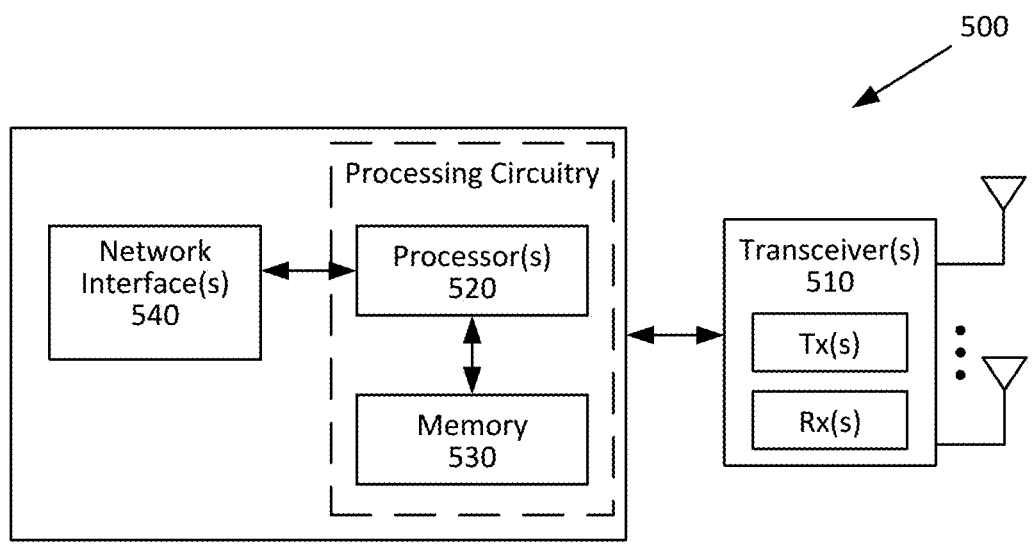
FIG. 10 is a block diagram of an example source network node.

FIG. 10 is a block diagram of an exemplary source network node 500, in accordance with certain embodiments. Network node 500 can be any of the source/destination nodes (e.g. RAN node, core network node, RRH 142, BBU 144) as have been described herein. Source network node 500 can be configured to implement the method of FIG. 8.

Network node 500 may include one or more of a transceiver 510, processor 520, memory 530, and network interface 540. In some embodiments, the transceiver 510 facilitates transmitting wireless signals to and receiving wireless signals from UE 110 (e.g., via transmitter(s) (Tx), receiver(s) (Rx), and antenna(s)) and/or other network nodes. The processor 520 executes instructions to provide some or all of the functionalities described above as being provided by a network node 500, the memory 530 stores the instructions executed by the processor 520. In some embodiments, the processor 520 and the memory 530 form processing circuitry. The network interface 540 communicates signals to network components, such as a gateway, switch, router, Internet, Public Switched Telephone Network (PSTN), core network nodes or radio network controllers, etc.

The processor 520 may include any suitable combination of hardware to execute instructions and manipulate data to perform some or all of the described functions of network node 500, such as those described above. In some embodiments, the processor 520 may include, for example, one or more computers, one or more central processing units (CPUs), one or more microprocessors, one or more application specific integrated circuits (ASICs), one or more field programmable gate arrays (FPGAs) and/or other logic.

The memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 540 is communicatively coupled to the processor 520 and may refer to any suitable device operable to receive input for network node 500, send output from network node 500, perform suitable processing of the input or output or both, communicate to other devices, or any combination of the preceding. The network interface 540 may include appropriate hardware (e.g., port, modem, network interface card, etc.) and software, including protocol conversion and data processing capabilities, to communicate through a network.

Other embodiments of network node 500 may include additional components beyond those shown in FIG. 10 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 10 may be included in other network nodes (such as core network node 130). Other network nodes may optionally include or not include a wireless interface (such as the transceiver 510 described in FIG. 10).

Figure 11:
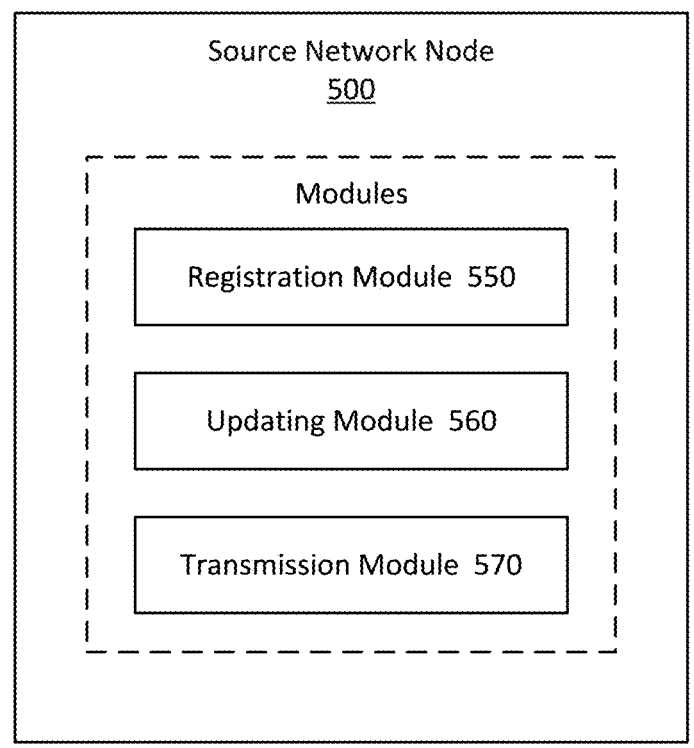
FIG. 11 is a block diagram of an example source network node with modules.

In some embodiments, the source network node 500, such as a RRH 142 or BBU 144, may comprise a series of modules configured to implement the functionalities of the node 500 as described above. Referring to FIG. 11, in some embodiments, the node 500 may comprise a registration module 550 for transmitting a scheduling request, an updating module 560 for updating the scheduling request, and a transmission module 570 for transmitting data.

It will be appreciated that the various modules may be implemented as combination of hardware and software, for instance, the processor, memory and transceiver(s) of node 500 shown in FIG. 10. Some embodiments may also include additional modules to support additional and/or optional functionalities.

Figure 12:
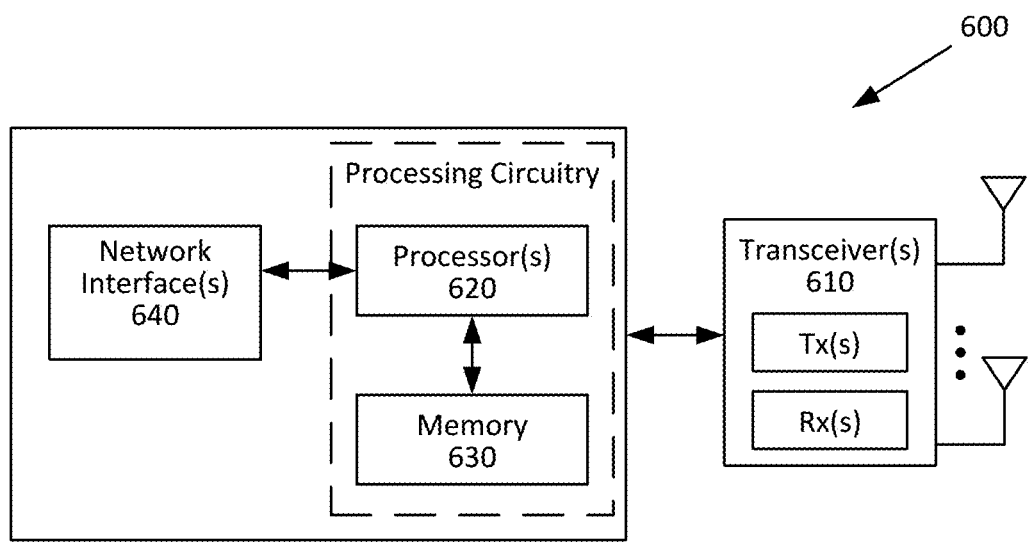
FIG. 12 is a block diagram of an example intermediate network node.

FIG. 12 is a block diagram of an exemplary intermediate network node 600, in accordance with certain embodiments. Intermediate network node 600 can be a switch 150 as has been described herein. Intermediate network node 600 can be configured to implement the method of FIG. 9.

Network node 600 may include one or more of a transceiver 610, processor 620, memory 630, and network interface 640. In some embodiments, the transceiver 610 facilitates transmitting wireless signals to and receiving wireless signals from UE 110 (e.g., via transmitter(s) (Tx), receiver(s) (Rx), and antenna(s)) and/or other network nodes. The processor 620 executes instructions to provide some or all of the functionalities described above as being provided by a network node 600, the memory 630 stores the instructions executed by the processor 620. In some embodiments, the processor 620 and the memory 630 form processing circuitry. The network interface 640 communicates signals to network components, such as a gateway, switch, router, Internet, Public Switched Telephone Network (PSTN), core network nodes or radio network controllers, etc.

The processor 620 may include any suitable combination of hardware to execute instructions and manipulate data to perform some or all of the described functions of network node 600, such as those described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 640 is communicatively coupled to the processor 620 and may refer to any suitable device operable to receive input for network node 600, send output from network node 600, perform suitable processing of the input or output or both, communicate to other devices, or any combination of the preceding. The network interface 640 may include appropriate hardware (e.g., port, modem, network interface card, etc.) and software, including protocol conversion and data processing capabilities, to communicate through a network.

Other embodiments of network node 600 may include additional components beyond those shown in FIG. 12 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 13:
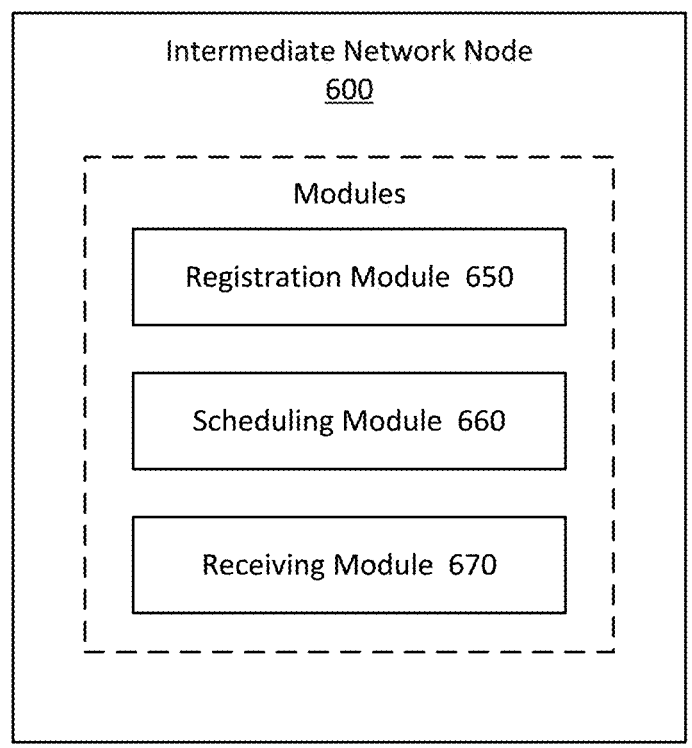
FIG. 13 is a block diagram of an example intermediate network node with modules.

In some embodiments, the intermediate network node 600, which can be for example a switch 150, may comprise a series of modules configured to implement the functionalities of the intermediate node 600 described above. Referring to FIG. 13, in some embodiments, the network node 600 can comprise a registration module 650 for receiving a registration request, a scheduling module 660 for determining how to schedule the registration request, and a receiving module 670 for receiving data.

It will be appreciated that the various modules may be implemented as combination of hardware and software, for instance, the processor, memory and transceiver(s) of node 600 shown in FIG. 12. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:

1×RTT CDMA2000 1×Radio Transmission Technology
3GPP Third Generation Partnership Project
ABS Almost Blank Subframe
ACK Acknowledgement
ADC Analog-to-digital conversion
AGC Automatic gain control
ANR Automatic neighbor relations
AP Access point
ARQ Automatic Repeat Request
AWGN Additive White Gaussian Noise band
BCCH Broadcast Control Channel
BCH Broadcast Channel
BLER Block error rate
BS Base Station
BSC Base station controller
BTS Base transceiver station
CA Carrier Aggregation
CC Component carrier
CCCH SDU Common Control Channel SDU
CDMA Code Division Multiplexing Access
CG Cell group
CGI Cell Global Identifier
CP Cyclic Prefix
CPICH Ec/No CPICH Received energy per chip divided by the power density in the
CPICH Common Pilot Channel
CQI Channel Quality information
C-RNTI Cell RNTI
CRS Cell-specific Reference Signal
CSG Closed subscriber group
CSI Channel State Information
DAS Distributed antenna system
DC Dual connectivity
DCCH Dedicated Control Channel
DCI Downlink Control Information
DFT Discrete Fourier Transform
DL Downlink
DL-SCH Downlink shared channel
DMRS Demodulation Reference Signal
DRX Discontinuous Reception
DTCH Dedicated Traffic Channel
DTX Discontinuous Transmission
DUT Device Under Test
EARFCN Evolved absolute radio frequency channel number
ECCE Enhanced Control Channel Element
ECGI Evolved CGI
E-CID Enhanced Cell-ID (positioning method)
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FDM Frequency Division Multiplexing
FFT Fast Fourier transform
GERAN GSM EDGE Radio Access Network
GSM Global System for Mobile communication
HARQ Hybrid Automatic Repeat Request
HD-FDD Half duplex FDD
HO Handover
HRPD High Rate Packet Data
HSPA High Speed Packet Access
LCMS Level of Criticality of the Mobility State
LPP LTE Positioning Protocol
LTE Long-Term Evolution
M2M Machine to Machine
MAC Medium Access Control
MBMS Multimedia Broadcast Multicast Services
MBSFN ABS MBSFN Almost Blank Subframe
MB SFN Multimedia Broadcast multicast service Single Frequency Network
MCG Master cell group
MDT Minimization of Drive Tests
MeNB Master eNode B
MIB Master Information Block
MME Mobility Management Entity
MPDCCH MTC Physical Downlink Control Channel
MRTD Maximum Receive Timing Difference
MSC Mobile Switching Center
MSR Multi-standard Radio
MTC Machine Type Communication
NACK Negative acknowledgement
NDI Next Data Indicator
NPBCH Narrowband Physical Broadcast Channel
NPDCCH Narrowband Physical Downlink Control Channel
NR New Radio
O&M Operation and Maintenance
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
PBCH Physical Broadcast Channel
PCC Primary Component Carrier
P-CCPCH Primary Common Control Physical Channel
PCell Primary Cell
PCFICH Physical Control Format Indicator Channel
PCG Primary Cell Group
PCH Paging Channel
PCI Physical Cell Identity
PDCCH Physical Downlink Control Channel
PDSCH Physical Downlink Shared Channel
PDU Protocol Data Unit
PGW Packet Gateway
PHICH Physical HARQ indication channel
PLMN Public Land Mobile Network
PMI Precoder Matrix Indicator
PRACH Physical Random Access Channel
ProSe Proximity Service
PRS Positioning Reference Signal
PSC Primary serving cell
PSCell Primary SCell
PSS Primary Synchronization Signal
PSSS Primary Sidelink Synchronization Signal
PUCCH Physical Uplink Control Channel
PUSCH Physical Uplink Shared Channel
QAM Quadrature Amplitude Modulation
RACH Random Access Channel
RAT Radio Access Technology
RB Resource Block
RF Radio Frequency
RLM Radio Link Management
RNC Radio Network Controller
RNTI Radio Network Temporary Identifier
RRC Radio Resource Control RRH Remote Radio Head
RRM Radio Resource Management
RRU Remote Radio Unit
RSCP Received Signal Code Power
RSRP Reference Signal Received Power
RSRQ Reference Signal Received Quality
RSSI Received Signal Strength Indicator
RSTD Reference Signal Time Difference
SCC Secondary Component Carrier
SCell Secondary Cell
SCG Secondary Cell Group
SCH Synchronization Channel
SDU Service Data Unit
SeNB Secondary eNodeB
SFN System Frame Number
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
SSS Secondary synchronization signal
SSSS Secondary Sidelink Synchronization Signal
TA Timing Advance
TAG Timing Advance Group
TDD Time Division Duplex
TDM Time Division Multiplexing
TTI Transmission Time Interval
Tx Transmitter
UARFCN UMTS Absolute Radio Frequency Channel Number
UE User Equipment
UL Uplink
UMTS Universal Mobile Telecommunication System
URLLC Ultra-Reliable Low Latency Communication
UTRA Universal Terrestrial Radio Access
UTRAN Universal Terrestrial Radio Access Network
V2I Vehicle-to-Infrastructure
V2P Vehicle-to-Pedestrian
V2X Vehicle-to-X
WCDMA Wide CDMA
WLAN Wireless Local Area Network

The invention claimed is:

1. A method for scheduling data transmission performed by an intermediate node in a data path, the method comprising:
receiving, from a preceding node in the data path, a timeslot registration request message requesting a preferred sending time for scheduling at least one data transmission;
determining if a conflict exists between the requested preferred sending time and any previously scheduled timeslots;
responsive to determining there is a conflict between the requested preferred sending time and a first previously scheduled timeslot, determining a next available timeslot that satisfies the received timeslot registration request;
scheduling the determined next available timeslot for the data transmission;
transmitting, to the preceding node, an update message indicating a modification to the requested preferred sending time; and
forwarding, to a subsequent node in the data path, a modified timeslot registration request message requesting the determined next available timeslot for scheduling the data transmission.

2. The method of claim 1, wherein the timeslot registration request message includes at least one of a flow identifier, an indication of a recurring period of transmission, and a frame size.

3. The method of claim 1, further comprising, adding the scheduled timeslot to a registration table.

4. The method of claim 1, further comprising, translating the requested preferred sending time to an absolute time.

5. The method of claim 4, wherein the translating is in accordance with at least one of a propagation delay between nodes, an arrival time of the request, and a processing time associated with the intermediate node.

6. The method of claim 4, wherein determining if a conflict exists is in accordance with comparing the translated preferred sending time to a registration table.

7. The method of claim 1, wherein determining if a conflict exists is further in accordance with an indication of a recurring period of transmission.

8. The method of claim 1, wherein determining the next available timeslot includes time-shifting the requested preferred sending time.

9. The method of claim 1, wherein the next available timeslot is determined in accordance with the timeslot registration request message.

10. The method of claim 1, wherein the update message includes a time shift value indicating an amount to adjust the requested preferred sending time.

11. A network node comprising circuitry including a processor and a memory, the memory containing instructions executable by the processor whereby the network node is operative to:
receive, from a preceding node in a data path, a timeslot registration request message requesting a preferred sending time for scheduling at least one data transmission;
determine if a conflict exists between the requested preferred sending time and any previously scheduled timeslots;
responsive to determining there is a conflict between the requested preferred sending time and a first previously scheduled timeslot, determine a next available timeslot that satisfies the received timeslot registration request;
schedule the determined next available timeslot for the data transmission;
transmit, to the preceding node, an update message indicating a modification to the requested preferred sending time; and
forward, to a subsequent node in the data path, a modified timeslot registration request message requesting the determined next available timeslot for scheduling the data transmission.

12. The network node of claim 11, wherein the timeslot registration request message includes at least one of a flow identifier, an indication of a recurring period of transmission, and a frame size.

13. The network node of claim 11, further operative to add the scheduled timeslot to a registration table.

14. The network node of claim 11, further operative to translate the requested preferred sending time to an absolute time.

15. The network node of claim 14, wherein the translating is in accordance with at least one of a propagation delay between nodes, an arrival time of the request, and a processing time associated with the intermediate node.

16. The network node of claim 14, wherein determining if a conflict exists is in accordance with comparing the translated preferred sending time to the registration table.

17. The network node of claim 11, wherein determining if a conflict exists is further in accordance with an indication of a recurring period of transmission.

18. The network node of claim 11, wherein determining the next available timeslot includes time-shifting the requested preferred sending time.

19. The network node of claim 11, wherein the next available timeslot is determined in accordance with the timeslot registration request message.

20. The network node of claim 11, wherein the update message includes a time shift value indicating an amount to adjust the requested preferred sending time.

21. A method for scheduling data transmission performed by an intermediate node in a data path, the method comprising:

receiving, from a preceding node in the data path, a timeslot registration request message requesting a preferred sending time for scheduling at least one data transmission;

determining if a conflict exists between the requested preferred sending time and any previously scheduled timeslots;

responsive to determining there is no conflict between the requested preferred sending time and the previously scheduled timeslots, scheduling the timeslot for the data transmission;

forwarding the timeslot registration request message to a subsequent node in the data path;

receiving, from the subsequent node in the data path, an update message indicating a modification to the requested preferred sending time;

modifying the scheduled timeslot for the data transmission in accordance with the update message; and forwarding, to the preceding node, the update message.

* * * * *